United States Patent [19]

Evani et al.

[11] 4,180,637
[45] Dec. 25, 1979

[54] PROCESS FOR THE PREPARATION OF LOW MOLECULAR WEIGHT ANHYDRIDE INTERPOLYMERS

[75] Inventors: Syamalarao Evani; Russell J. Raymond, both of Midland, Mich.

[73] Assignee: The Dow Chemical Company, Midland, Mich.

[21] Appl. No.: 849,281

[22] Filed: Nov. 7, 1977

[51] Int. Cl.$^2$ .................. C08F 2/38; C08F 222/02; C08F 222/04; C08F 222/06

[52] U.S. Cl. ................................. 526/204; 526/173; 526/179; 526/180; 526/182; 526/271; 526/208; 526/213; 526/217; 526/218; 526/220; 526/233; 526/234; 526/236; 526/237; 526/272; 526/216

[58] Field of Search ............... 526/272, 271, 173, 179, 526/180, 182

[56] References Cited

U.S. PATENT DOCUMENTS

| | | | |
|---|---|---|---|
| 2,606,891 | 8/1952 | Rowland | 526/272 |
| 2,640,819 | 6/1953 | Barrett | 526/272 |
| 2,744,098 | 5/1956 | Towne | 526/272 |
| 2,798,062 | 7/1957 | Contois | 526/272 |
| 2,913,437 | 11/1959 | Johnson | 526/272 |
| 2,938,016 | 5/1960 | Johnson | 526/272 |
| 3,085,994 | 4/1963 | Muskat | 526/272 |
| 3,178,395 | 4/1965 | Muskat | 526/272 |
| 3,342,787 | 9/1967 | Muskat | 526/272 |
| 3,380,972 | 4/1968 | LeBlanc et al. | 526/272 |
| 3,392,155 | 7/1968 | Muskat | 526/272 |
| 3,451,979 | 6/1969 | Muskat | 526/272 |
| 3,474,114 | 10/1969 | Kuhlkamp et al. | 526/271 |
| 3,558,570 | 1/1971 | Rinno et al. | 526/272 |
| 3,926,925 | 12/1975 | Kuntz | 526/272 |
| 3,929,738 | 12/1975 | Curtis et al. | 526/272 |
| 3,972,903 | 8/1976 | Gross | 526/272 |
| 4,074,036 | 2/1978 | Tuller et al. | 526/272 |

*Primary Examiner*—John Kight, III
*Attorney, Agent, or Firm*—James B. Guffey

[57] ABSTRACT

Low molecular weight polymers of an unsaturated dicarboxylic anhydride monomer (e.g., maleic anhydride) and a copolymerizable monomer (e.g., styrene) are prepared by an improved process which comprises polymerizing the monomers in the presence of the hydroxide or a nucleophilic salt of a monovalent cation (e.g., a nucleophilic salt or the hydroxide of an ammonium compound or of an alkali metal). By the practice of this process, low molecular weight polymers are conveniently and economically obtained without the use of high catalyst concentrations, high temperatures, conventional chain transfer agents, high boiling chain transfer solvents or combinations thereof.

16 Claims, No Drawings

PROCESS FOR THE PREPARATION OF LOW MOLECULAR WEIGHT ANHYDRIDE INTERPOLYMERS

BACKGROUND OF THE INVENTION

This invention relates to low molecular weight polymers of unsaturated dicarboxylic anhydrides with copolymerizable monomers and to a process for their preparation.

Polymers of unsaturated dicarboxylic acid anhydrides with copolymerizable monomers, such as copolymers of styrene and maleic anhydride, have been used in a wide variety of applications including coating and adhesive applications. In many of such uses, the efficacy for a particular purpose depends largely upon the molecular weight of such polymers. For example, for certain uses (e.g., as dispersants for pigments, slurries, grinding aids, etc.; as viscosity control agents in coating formulations; as embrittling agents in rug shampoos; and as emulsifying agents or protective colloids), it is necessary that such polymers have relatively low molecular weights.

Various techniques have been employed in the prior art to control the molecular weight of such polymers to the desired low level. Such prior art techniques have included the use of (A) high polymerization temperature; (B) high concentrations of free radical catalysts; (C) chain transfer agents, such as (1) mercaptans in solution polymerizations (U.S. Pat. No. 2,606,891), (2) ditertiary butyl parabenzoquinone in mass polymerizations (U.S. Pat. No. 2,640,819), (3) aldehydes (U.S. Pat. No. 2,938,016), and (4) cyclic molecular weight regulators (e.g., methylene cyclobutane, terpinolene, etc.) in high temperature mass polymerizations (U.S. Pat. No. 3,380,972); (D) chain terminating solvent systems (U.S. Pat. Nos. 2,913,437; 3,085,994; 3,342,787; and 3,392,155); and (E) special polymerization chronology (U.S. Pat. No. 2,744,098). In addition, hybrids of the foregoing individual techniques have been employed such as combined use of high temperature, specially controlled monomer feed, chain terminating solvents and polymer product precipitation. See, for example, U.S. Pat. Nos. 3,178,395; 3,451,979 and 3,558,570.

Unfortunately, however, all of such prior art techniques suffer one or more disadvantages such as high cost, production of colored products, retention of impurities in the resulting polymer, requirement of special solvents and difficult solvent removal, etc.

In view of the attendant disadvantages of the aforementioned prior art techniques, it would be highly desirable to provide an improved process for preparing low molecular weight polymers of unsaturated dicarboxylic anhydrides with copolymerizable monomers which improved process is free of such prior art deficiencies.

SUMMARY OF THE INVENTION

The present invention is such as improved process for preparing a low molecular weight polymer which polymer comprises at least one unsaturated dicarboxylic anhydride monomer and at least one copolymerizable monomer. The improvement of such process comprises polymerizing such monomers in the presence of a nucleophilic salt, or the hydroxide, of a monovalent cation.

The improved process of the invention is advantageous in that the salts and hydroxides employed are inexpensive, readily available, and effective at low concentrations for obtaining low molecular weight polymer product.

The resulting low molecular weight polymers and derivatives thereof (e.g., salts and esters thereof) are useful in a variety of applications such as in use as dispersing agents, as viscosity control agents, as emulsifying agents, as embrittling agents, as protective colloids, etc.

DETAILED DESCRIPTION OF THE INVENTION

Low molecular weight polymers suitably prepared pursuant to the improved process of the invention include the free radical solution polymerization product of at least one unsaturated dicarboxylic anhydride monomer and at least one other monomer which is copolymerizable with such anhydride monomer.

Suitable unsaturated dicarboxylic anhydride monomers include $\alpha,\beta$-monoethylenically unsaturated dicarboxylic anhydrides such as maleic anhydride, methyl maleic anhydride (i.e., citraconic anhydride), ethyl maleic anhydride, phenyl maleic anhydride, benzyl maleic anhydride, dimethyl maleic anhydride, dibenzyl maleic anhydride, chloromaleic anhydride, and comonomeric mixtures thereof. Maleic anhydride is the preferred unsaturated dicarboxylic anhydride monomer.

Suitable monomers for copolymerization with one or more of the aforementioned anhydride monomers in the practice of this invention include the monovinylidene monomers and the $\alpha$-olefin monomers which are known to polymerize with the aforementioned unsaturated dicarboxylic anhydrides. Typical monovinylidene monomers that can be employed include vinyl esters of organic acids such as vinyl acetate, vinyl stearate, etc.; ethylenically unsaturated halides such as vinyl chloride, vinylidene chloride, vinyl bromide, etc.; monovinylidene aromatic monomers such as styrene, $\alpha$-methylstyrene, vinyl naphthalene and the ring-alkyl and ring-halogen substituted derivatives thereof, e.g., vinyl toluenes, vinyl xylenes, chlorostyrene, 2,5-dichlorostyrene, 2-methyl-4-chloro-styrene, t-butyl styrene, etc.; vinyl alkyl ethers, e.g., vinyl methyl ether, vinyl isobutyl ether, etc.; monovinylidene heterocyclic compounds such as vinyl pyridine, etc.; and mixtures of two or more of said monovinylidene monomers. Typical $\alpha$-olefin monomers that can be employed include ethylene, propylene, isobutylene, 1-butene, 1-pentene, etc.

The preferred copolymerizable monomers for use in the practice of this invention are the aforementioned monovinylidene aromatic monomers, especially styrene and the $\alpha$- or ring-substituted derivatives thereof. Most preferably, the copolymerizable monomer is styrene.

The ratio of the copolymerizable monomer to the unsaturated dicarboxylic anhydride monomer can vary depending on the properties desired of the resulting polymer as required for its intended practical application. However, as a general rule the mole ratio of copolymerizable monomer to anhydride monomer is from about 1:1 to about 5:1. Preferably such monomers are employed in approximately equimolar amounts (i.e., in the proportion of about 1 mole of copolymerizable monomer per mole of anhydride monomer).

The molecular weight of the copolymers prepared pursuant to the practice of the invention can vary and can be conveniently controlled to the desired value by controlling the concentration of the hereinafter described salt or hydroxide, the reaction temperature, catalyst concentration, etc. However, as a general rule, such copolymers have weight averaged molecular weights in the range of from about 1,000 to about 10,000, preferably from about 1,000 to about 5,000, as determined by conventional absolute molecular weight measurement techniques such as light scattering or by conventional indirect techniques such as intrinsic viscosity or inherent viscosity.

The process of the invention is conducted in an organic solvent in which the monomers and the resulting low molecular weight polymer are soluble. Any organic liquid which meets such solubility criterion and which is inert under the polymerization conditions employed can be used as the solvent. As used herein the word "inert" is used in its accepted sense to indicate that the solvent does not react chemically with the monomers, with the polymer, with the salt or hydroxide or with the catalyst. Typical solvents which are advantageously employed include ketones such as acetone, methyl ethyl ketone (commonly called MEK), methyl isobutyl ketone, diethyl ketone, etc.; esters such as ethyl acetate, butyl acetate, etc.; cyclic ethers such as dioxane, tetrahydrofuran, etc.; and the like.

The hereinbefore described monomers polymerize quite satisfactorily in the aforementioned solvents at concentrations of from about 10 to about 50, preferably from about 20 to about 30, percent by weight on a total solution weight basis. However, operation outside such concentration is sometimes desirable and can be readily accomplished without departing from the spirit and scope of the present invention. It is to be noted, however, that when operating at the higher monomer concentrations (e.g., in the range of about 40 to about 50 percent or more), it is preferable to employ continous monomer addition as a means of controlling the polymerization.

The process of the invention is typically conducted in the presence of a free radical catalyst of the kind and in the amounts already known in the art. Typically such catalysts are soluble in the polymerization medium (i.e., the monomer and solvent solution) in an amount sufficient to effect polymerization. Exemplary of such catalysts are the peroxide and azo type catalysts such as benzoyl peroxide, acetyl peroxide, lauroyl peroxide, succinyl peroxide, tert-butyl hydroperoxide, di-tert-butyl peroxide, tert-butyl perbenzoate, di-tert-butyl diperphthalate, azobisisobutyronitrile, α-(t-butyl)isobutyronitrile, 2-(t-butylazo)-2-cyano-4-methylpentane, 2-(t-butylazo)-2-cyano-4-methoxy-4-methylpentane, 2-(t-butylazo)isobutyronitrile, 2-(t-butylazo)-2-cyanobutane, 1-(t-butylazo)-1-cyanocyclohexane and the like. The amount of such catalyst employed typically ranges from about 0.05 to about 5 percent, preferably from about 0.25 to about 2 percent, by weight based upon the total monomer weight.

The advance or improvement in the art embodied in the present invention resides in conducting the polymerization of the unsaturated dicarboxylic anhydride monomer with the copolymerizable monomer in the presence of a nucleophilic salt, or the hydroxide, of a monovalent cation. Such improvement provides a substantially lower molecular weight polymer product than is obtained under the same polymerization conditions in the absence of such salt or hydroxide and such phenomenon is conveniently observed by comparing the inherent viscosity of a polymer prepared in the presence of such salt or hydroxide to that of a corresponding polymer prepared in the absence thereof, all other conditions being held constant.

The salts or hydroxides suitable for use in the present invention include the hydroxide or nucleophilic salts of monovalent cations such as ammonium cations (including quaternary ammonium cations) and alkali metal cations (especially lithium, sodium and potassium). Suitable hydroxides thus include lithium hydroxide, sodium hydroxide, potassium hydroxide, ammonium hydroxide, quaternary ammonium hydroxide, (e.g., tetramethylammonium hydroxide, tetraethylammonium hydroxide, octadecyldimethylbenzyl ammonium hydroxide, etc.), and the like.

Suitable nucleophilic salts of the aforementioned monovalent cations include those wherein the anion thereof has a nucleophilic constant, n, of at least about 1.0 (preferably greater than about 2.5) as determined, for example, by the method described by Jack Hines in *Physical Organic Chemistry*, McGraw-Hill Book Co., New York, N.Y. (1962) at pages 160 and 161. Nucleophilic salts advantageously employed in the present invention thus include halides (especially the chlorides, bromides and iodides) such as lithium halides, sodium halides, potassium halides, ammonium halides, quaternary ammonium halides (e.g., tetramethylammonium chloride, tetraethylammonium chloride, benzylhexadecyldimethylammonium chloride, etc.); cyanates such as potassium cyanate and sodium cyanate; thiocyanates such as sodium thiocyanate, potassium thiocyanate, ammonium thiocyanate, etc.; thiosulfates such as sodium thiosulfate, potassium thiosulfate, ammonium thiosulfate, etc.; sulfites such as sodium sulfite, potassium sulfite, ammonium sulfite, etc.; nitrites such as sodium nitrite and potassium nitrite; carbonates such as ammonium bicarbonate, lithium bicarbonate, sodium bicarbonate, potassium bicarbonate, etc.; phosphates such as the sodium phosphates, the ammonium phosphates, the potassium phosphates, lithium phosphate, etc.; phosphites such as ammonium phosphite, sodium phosphite, potassium phosphite, etc.; organic salts such as sodium formate, sodium acetate, sodium chloroacetate, sodium propionate, sodium lactate, sodium citrate, sodium fumarate, sodium succinate, sodium benzoate, lithium acetate, lithium benzoate, potassium acetate, potassium citrate, potassium gluconate, potassium laurate, ammonium acetate, ammonium benzoate, ammonium gluconate and the like. Also operable in the practice of the invention, but generally less effective and accordingly less preferred, are sulfates such as sodium sulfate, potassium sulfate, ammonium sulfate, lithium sulfate, etc., and nitrates such as sodium nitrate, ammonium nitrate, potassium nitrate, lithium nitrate, etc.

Salts and hydroxides which are particularly advantageous in the practice of the invention include lithium chloride, tetramethylammonium chloride, sodium iodide, sodium thiocyanate, sodium bicarbonate, disodium hydrogen phosphate, sodium sulfite, sodium thiosulfate, sodium nitrite, sodium acetate, sodium fumarate, sodium succinate, and sodium hydroxide. Lithium chloride is most preferred.

The amount of the aforementioned salt or hydroxide employed in the practice of this invention can vary depending upon the molecular weight desired for the resulting polymer product with the polymer molecular weight decreasing with increased salt or hydroxide concentrations. As a general rule, however, such salt or hydroxide is employed in an amount corresponding to from about 50 to about 15,000 parts per million, preferably from about 50 to about 10,000 parts per million and most preferably from about 100 to about 5,000 parts per million, based upon the total monomer weight.

The salt or hydroxide employed can be charged to the polymerization process in any convenient manner. For example, it can be charged as a dry powder if such is its normal state under ambient conditions or as an aqueous or organic solution. However, it is generally most convenient, and thus preferred, to add the salt or hydroxide in the form of an aqueous or alcoholic solution.

It is also preferred that the salt or hydroxide be charged into the polymerization vessel prior to initiating the polymerization. Thus in batch polymerizations, for example, the salt or hydroxide is preferably charged to the polymerization vessel prior to or simultaneous with the monomer charge or subsequent to addition of the monomer but before initiation of the reaction. In continuous polymerization processes the salt or hydroxide is preferably added continuously and at a constant ratio relative to the continuous monomer feed.

The improved polymerization process of the invention is conducted pursuant to the same general procedures and operating conditions as are conventionally employed in the art for the preparation of similar (but relatively higher molecular weight) polymers. Thus, the anhydride monomer and copolymerizable monomer are typically copolymerized in the aforementioned solvent at a temperature between about 50° and about 150° C., preferably between about 70° and about 125° C. In addition, performance of the polymerization at about atmospheric pressure (e.g., under reflux conditions) is generally most convenient and therefore preferred. Naturally, however, when one or more of the monomers or the solvent employed boil below the chosen reaction temperature, polymerization at superatmospheric pressure is required.

Certain of the aforementioned prior art techniques for molecular weight reduction (e.g., chain transfer agents, high temperature operation, high catalysts concentrations, etc.) can be employed in conjunction with the improvement disclosed herein in order to obtain even lower molecular weight products. However, resort to such additional techniques is not generally required for most low molecular weight products of commercial interest. In addition, resort to such techniques introduces the aforementioned disadvantages characteristic of such prior art techniques. Accordingly, use of such techniques in conjunction with the improvement of the invention does not generally constitute a preferred embodiment.

Following the polymerization, the resulting low molecular weight polymers can be recovered in any convenient, conventional manner from the polymerization medium.

The resulting low molecular weight polymers and known derivatives thereof are useful as dispersants for pigments, slurries, grinding aids; as viscosity control agents in coating formulations; as embrittling agents in rug shampoos; as emulsifiers; and as protective colloids.

To further illustrate the practice of the invention, without intending to limit the scope thereof, the following examples are presented.

EXAMPLES 1-4

Styrene/Maleic Anhydride Polymerized in the Presence of Lithium Chloride

The following master solution is made:

| | | |
|---|---|---|
| Styrene | 104 | g (1 gram mole) |
| Maleic anhydride | 98 | g (1 gram mole) |
| Azobisisobutyronitrile | 0.5 | g (0.25% based on total monomer weight) |
| Methyl ethyl ketone (MEK) | 425 | g |

Five 12 ounce citrus bottles are each charged with 125 grams of the above monomer solution. Lithium chloride is added (in the form of an aqueous solution thereof) to each of the bottles in an amount sufficient to provide the lithium chloride concentrations indicated below.

The contents of each of the bottles are flushed with $N_2$, capped and polymerized at 90° for 5 hours. The resulting copolymer solutions in each bottle are devolatilized at 100° C. under vacuum to remove the MEK. The respective copolymers are then powdered and the inherent viscosity of each of the copolymers is then determined by dissolving the copolymer in acetone (0.05±0.0002 gram of copolymer dissolved in 20 ml acetone) and running the resulting solution through an Ostwald viscometer at 25° C.

The inherent viscosity is calculated as follows:

$$\text{Inherent Viscosity} = \log_n \frac{\text{Solution viscosity (i.e., flow time of 20 ml of solution in sec.)}}{\text{Solvent viscosity (i.e., flow time of 20 ml of solvent in sec.)}} \div \frac{0.25 \text{ gram copolymer per } 100 \text{ grams solvent}}{}$$

The inherent viscosity results thus determined provides a relative measure of molecular weight and such results are presented below.

| Polymer Solution From: | LiCl Conc. (ppm based on monomer weight) | Inherent Viscosity |
|---|---|---|
| C-1* | 0 | 0.30 |
| 1 | 125 | 0.15 |
| 2 | 625 | 0.078 |
| 3 | 1250 | 0.069 |
| 4 | 6250 | 0.039 |

*Not an example of the invention

The above examples indicate that, by the use of small quantities of LiCl in the styrene/maleic anhydride (i.e., S/MA) polymerization, the inherent viscosity (and accordingly the molecular weight) of the resulting copolymer is significantly lower than that of the copolymer made in the absence of LiCl (i.e., C-1).

EXAMPLE 5

Styrene/Maleic Anhydride Polymerized in the Presence of Sodium Chloride

A master solution of monomers is made according to the following recipe:

| | |
|---|---|
| Styrene | 52.0 g |

| -continued | |
|---|---|
| Maleic anhydride | 49.0 g |
| Azobisisobutyro-nitrile | 0.496 g (0.5 weight percent based on total monomer i.e., BOM) |
| Methyl ethyl ketone | 200 g |

Half the amount of the above solution is transferred to a 500 ml three-necked reaction flask equipped with a reflux condenser, a nitrogen source, and a heating mantle. The remaining solution is transferred to a similarly equipped reaction flask. A 1.25 cc portion of distilled water is added to the first reaction mixture. A 1.25 cc portion of an aqueous solution containing 10 percent sodium chloride on a total weight basis is added to the second reaction mixture.

Polymerization of each of the two batches is conducted at 75°–80° C. for three hours. After polymerization, the respective polymer syrups are devolatilized under vacuum and the inherent viscosities of the respective resulting copolymers are determined pursuant to the procedure of Examples 1–4.

The inherent viscosity of copolymer made without sodium chloride is 0.68 whereas the inherent viscosity of copolymer made with sodium chloride (i.e., from Example 5) is 0.35

As can be seen, the presence of the sodium chloride resulted is a copolymer having a substantially lower inherent viscosity, and accordingly, a substantially lower molecular weight.

EXAMPLES 6–22

Styrene/Maleic Anhydride Polymerized in the Presence of Various Salts and Hydroxides Styrene and maleic anhydride are employed as the monomers in 1:1 mole ratio and in an amount corresponding to 30 weight percent total monomer on a total monomer plus solvent weight basis. Methyl ethyl ketone (i.e., MEK) is employed as the solvent and azobisisobutyronitrile is employed as the catalyst in an amount corresponding to 1.0 weight percent based on the total monomer weight. The salts and hydroxides employed (in an amount corresponding $4.77 \times 10^{-3}$ mole per 100 grams of monomer) are indicated in Table I below.

The monomer charges are weighed into 12 ounce citrate bottles and the MEK, the catalyst and the indicated salt are then added. The bottles are flushed with gaseous nitrogen and capped. The polymerization mixtures are then polymerized at 80° C. in a tumbler reactor for about 16 hours.

Following polymerization, the bottles are cooled to ambient temperature (i.e., about 25° C.) and the percent copolymer solids [(weight of copolymer divided by weight of solution)×100 percent] in the resulting polymer syrups are determined by drying a portion of the individual syrups in a vacuum. The yield of copolymer product is nearly quantitative in all cases.

The inherent viscosity of each of the copolymer products is determined pursuant to the procedure of Examples 1–4 except that methyl ethyl ketone is employed as the solvent in place of acetone. The results are summarized in Table I.

As can be seen, the copolymers prepared in accordance with the process of the invention have substantially lower inherent viscosity (and thus lower molecular weight) than those prepared in the absence of the salts or hydroxides of the Examples. (Compare C-2 - C-4 with Examples 6–22.)

The effects of other salts and an acid are illustrated in comparative examples C-5 - C-10. The effects of conventional chain transfer agents are illustrated in comparative examples C-11 and C-12.

TABLE I:
EFFECTS OF VARIOUS SALTS ON INHERENT VISCOSITY

| Example | Salt or Hydroxide Type | Amount[1] | Inherent Viscosity |
|---|---|---|---|
| C-2* | None | 0 | 0.289 |
| C-3* | None | 0 | 0.281 |
| C-4* | None | 0 | 0.296 |
| 6 | NaCNS | 3,820 | 0.085 |
| 7 | NaI | 7,070 | 0.170 |
| 8 | NaBr | 4,850 | 0.206 |
| 9 | NaHCO$_3$ | 3,960 | 0.112 |
| 10 | Na$_2$HPO$_4$ | 6,700 | 0.127 |
| 11 | Na$_2$SO$_3$ | 5,940 | 0.162 |
| 12 | Na$_2$S$_2$O$_3$ . 5H$_2$O | 11,700 | 0.170 |
| 13 | NaNO$_2$ | 3,250 | 0.118 |
| 14 | NaCl | 2,760 | 0.242 |
| 15 | KCl | 3,560 | 0.207 |
| 16 | NaC$_2$H$_3$O$_2$ | 3,870 | 0.133 |
| 17 | Na$_2$C$_2$O$_4$ | 6,320 | 0.208 |
| 18 | Na Fumarate | 6,510 | 0.107 |
| 19 | Na Succinate | 6,600 | 0.112 |
| 20 | NaOH | 1,890 | 0.112 |
| 21 | (CH$_3$)$_4$NCl | 5,140 | 0.047 |
| 22 | Na$_2$SO$_4$ . 10H$_2$O | 15,200 | 0.273 |
| C-5* | ZnCl$_2$ | 6,430 | 0.332 |
| C-6* | MgCl$_2$ . 6H$_2$O | 9,590 | 0.276 |
| C-7* | FeCl$_2$ . 4H$_2$O | 9,380 | No Check[2] |
| C-8* | SnCl$_2$ . 2H$_2$O | 10,640 | 0.342 |
| C-9* | CaCl$_2$ | 5,230 | 0.249 |
| C-10* | H$_2$SO$_4$ | 4,620 | 0.335 |
| C-11* | CH$_3$(CH$_2$)$_{11}$SH | 9,830 | 0.188 |
| C-12* | CBr$_4$ | 15,640 | 0.162 |

*Not an example of the invention.
[1]Parts per million parts of monomer (wt. basis).
[2]Not checked due to poor yield.

EXAMPLES 23–25

Styrene/Maleic Anhydride Polymerized in Various Solvents and with Various Catalysts The procedure of Examples 6–22 is repeated using the indicated types and amounts of catalysts and solvents. The results, which are summarized in Table II, illustrate the desirability of employing solvents in which the monomers and the resulting polymer are soluble. (Compare Examples 24 and 25 with C-14.) The same phenomenon is observed by comparing C-15 or Table II with Example 21 in Table I above.

TABLE II
EFFECTS OF VARIOUS SOLVENTS AND CATALYSTS

| Example | Solvent Type | Amount[1] | Catalyst[2] | Salt Type | Amount[3] PPM by Weight Based on Monomer | Inherent Viscosity |
|---|---|---|---|---|---|---|
| C-13* | Toluene[3] | 90 wt % | Azobisisobutyronitrile | None | 0 | 0.269 |

TABLE II-continued
EFFECTS OF VARIOUS SOLVENTS AND CATALYSTS

| Example | Solvent Type | Amount[1] | Catalyst[2] | Salt Type | Salt Amount[3] PPM by Weight Based on Monomer | Inherent Viscosity |
|---|---|---|---|---|---|---|
| C-14* | " | " | " | LiCl | 2,000 | 0.252 |
| C-15* | " | " | " | (CH$_3$)$_4$NCl | 5,140 | 0.225 |
| C-16* | Methyl ethyl ketone | 70 wt % | Benzoyl peroxide | None | 0 | 0.393 |
| 23 | " | " | " | LiCl | 2,000 | 0.104 |
| C-17* | Tetrahydrofuran | 70 wt % | Azobisisobutyronitrile | None | 0 | 0.142 |
| 24 | " | " | " | LiCl | 2,000 | 0.075 |
| C-18* | Acetone | 70 wt % | " | None | 0 | 0.263 |
| 25 | " | " | " | LiCl | 2,000 | 0.047 |

*Not an example of the invention.
[1]Based on monomer plus solvent weight.
[2]Catalyst employed at 1 wt percent based on monomer.
[3]Not a solvent for both monomer and polymer.

EXAMPLES 26 and 27

Copolymers of Varying Monomers

The procedure of Examples 6–22 is repeated using different monomer compositions. The monomeric compositions and the results are presented in Table III.

Comparison of the results for Examples 26 and 27, with the results for comparative experiments C-19 and C-20, respectively, illustrate the molecular weight reduction brought about by using lithium chloride in the polymerization of such monomers.

TABLE III
LiCl EFFECT WITH DIFFERING MONOMERS

| Example | Monomers | Salt Type | Conc. Based on Monomer Weight | Inherent Viscosity |
|---|---|---|---|---|
| C-19* | Styrene/Citraconic Anhydride (2:1 mole ratio) | None | 0 | 0.089 |
| 26 | Styrene/Citraconic Anhydride (2:1 mole ratio) | LiCl | 2,000 ppm | 0.035 |
| C-20* | Vinyl Toluene/Maleic Anhydride (1:1 mole ratio) | None | 0 | 0.329 |
| 27 | Vinyl Toluene/Maleic Anhydride (1:1 mole ratio) | LiCl | 2,000 ppm | 0.102 |

*Not an example of the invention

EXAMPLES 28–34

Varying LiCl Concentrations in Styrene/Maleic Anhydride Polymerizations

The procedure of Examples 6–22 is repeated using lithium chloride as the salt at various concentrations. The results are summarized in Table IV.

TABLE IV
EFFECT OF INCREASED SALT CONCENTRATION

| Example | LiCl Concentration PPM Based on Monomer Weight | Inherent Viscosity |
|---|---|---|
| C-21* | None | 0.261 |
| 28 | 100 | 0.195 |
| 29 | 200 | 0.162 |
| 30 | 500 | 0.126 |
| 31 | 1,000 | 0.103 |
| 32 | 1,500 | 0.087 |
| 33 | 2,000 | 0.072 |
| 34 | 3,000 | 0.070 |

*Not an example of the invention

As can be seen from the results in Table IV, employing increased LiCl concentrations decreases the molecular weight of the S/MA copolymer formed as evidenced by the decreased inherent viscosity of the resulting copolymers.

While the practice of the invention has been illustrated by reference to specific embodiments thereof, such specific embodiments are not to be understood as limiting the scope of the instantly claimed invention.

What is claimed is:

1. In a process for preparing a low molecular weight polymer comprising polymerizing at least one unsaturated dicarboxylic acid anhydride monomer with at least one copolymerizable monomer in an organic solvent in which the monomers and the polymer are soluble and in the presence of a free radical catalyst, the improvement which comprises polymerizing the monomers in the presence of the hydroxide or a nucleophilic salt of a monovalent cation selected from the group consisting of ammonium, quaternary ammonium cations and alkali metal cations.

2. The improvement of claim 1 wherein the hydroxide or salt is employed in the amount of from about 50 to about 15,000 parts per million based on the total monomer weight.

3. The improvement of claim 1 wherein the hydroxide or salt is employed in the amount of from about 100 to about 5,000 parts per million based on the total monomer weight.

4. The improvement of claim 1 wherein the anhydride monomer comprises an α,β-monoethylenically unsaturated dicarboxylic anhydride.

5. The improvement of claim 1 wherein the anhydride monomer comprises maleic anhydride.

6. The improvement of claim 1 wherein the copolymerizable monomer comprises a monovinylidene monomer or an α-olefin monomer.

7. The improvement of claim 1 wherein the copolymerizable monomer comprises a monovinylidene aromatic monomer.

8. The improvement of claim 1 wherein the copolymerizable monomer styrene.

9. The improvement of claim 1 wherein the mole ratio of anhydride monomer to copolymerizable monomer is from about 1:5 to about 1:1.

10. The improvement of claim 1 wherein the mole ratio of anhydride monomer to copolymerizable monomer is about 1:1.

11. the improvement of claim 1, wherein the organic solvent is a ketone, an ester or a cyclic ether.

12. The improvement of claim 1 wherein the organic solvent is acetone, methyl ethyl ketone, methyl isobutyl ketone, diethyl ketone, ethyl acetate butyl, acetate, dioxane or tetrahydrofuran.

13. The improvement of claim 1 wherein the monomers are polymerized in the presence of a nucleophilic salt or the hydroxide of an ammonium cation or of an alkali metal cation.

14. The improvement of claim 1 wherein the monomers are polymerized in the presence of a nucleophilic salt or the hydroxide of lithium, sodium, potassium or an ammonium cation.

15. The improvement of claim 1 wherein the monomers are polymerized in the presence of a nucleophilic salt or the hydroxide of a quaternary ammonium cation.

16. The improvement of claim 1 wherein the monomers are polymerized in the presence of lithium chloride, tetramethylammonium chloride, sodium iodide, sodium thiocyanate, sodium bicarbonate, disodium hydrogen phosphate, sodium sulfite, sodium thiosulfate, sodium nitrite, sodium acetate, sodium fumarate, sodium succinate or sodium hydroxide.

* * * * *

UNITED STATES PATENT AND TRADEMARK OFFICE
CERTIFICATE OF CORRECTION

PATENT NO. : 4,180,637
DATED : December 25, 1979
INVENTOR(S) : Syamalarao Evani; Russell J. Raymond It is certified that error appears in the above-identified patent and that said Letters Patent are hereby corrected as shown below:

Col. 1, line 59, delete "as" and insert --an--.

Col. 2, line 31, delete "mononers" and insert --monomers--.

Col. 3, line 35, delete "continous" and insert --continuous--.

Col. 3, line 43, delete "effect" and insert --affect--.

Col. 7, line 27, after "0.35" insert --.-- (period).

Col. 7, line 29, delete "is" and insert --in--.

Col. 7, line 44, delete "4.77" and insert --4.717--.

Col. 8, line 58, delete "or" and insert --of--.

Col. 11, line 9, after "monomer" insert --comprises--.

Col. 11, line 17, delete the first "the" and insert --The--;
line 17, delete "1," and insert --1--.

Signed and Sealed this

Twentieth Day of May 1980

[SEAL]

Attest:

SIDNEY A. DIAMOND

Attesting Officer    Commissioner of Patents and Trademarks